United States Patent [19]

Hassler, Jr. et al.

[11] Patent Number: 4,892,416

[45] Date of Patent: Jan. 9, 1990

[54] PRECISION CARRIAGE AND HOUSING FOR RELATIVE POSITION SENSING DEVICE

[75] Inventors: William L. Hassler, Jr., El Toro; Falin Shieh, Irvine, both of Calif.

[73] Assignee: Parker Hannifin Corporation, Cleveland, Ohio

[21] Appl. No.: 216,747

[22] Filed: Jul. 8, 1988

[51] Int. Cl.$^4$ .................. F16C 29/04; F16C 29/08; G01B 11/04

[52] U.S. Cl. ............................ 384/58; 384/15; 384/53

[58] Field of Search ...................... 384/7–10, 384/15, 25, 50, 53–55, 58; 33/125 C; 356/169

[56] References Cited

U.S. PATENT DOCUMENTS

| | | | |
|---|---|---|---|
| 1,245,324 | 11/1917 | Droitcour | 384/10 |
| 2,907,939 | 10/1959 | Apgar | 318/28 |
| 3,407,011 | 10/1968 | Zeidler | 384/54 |
| 3,816,003 | 6/1974 | Litke | 356/169 |
| 3,867,037 | 2/1975 | Litke | 356/169 |
| 4,070,759 | 1/1978 | Nelle | 33/125 C |
| 4,198,757 | 4/1980 | Neele | 33/125 C |
| 4,222,461 | 9/1980 | Gunti | 384/53 X |
| 4,340,814 | 7/1982 | DiCiaccio | 250/231 SE |
| 4,376,543 | 3/1983 | Sakagami | 384/15 X |
| 4,387,300 | 6/1983 | Dudash | 250/239 |

Primary Examiner—Thomas R. Hannon
Attorney, Agent, or Firm—Christopher H. Morgan

[57] ABSTRACT

A carriage and housing for a position sensing device of the type having a carriage for carrying a reader for reading the position of the carriage with respect to the housing along a position line of the device. The improvements include a carriage with five bearings to restrict the carriage to motion parallel to the position line. The carriage and housing are isolated in a frame of reference by the housing having first and second planar reference surfaces on which the bearings ride and first and second springs which urge the carriage toward the first and second reference surfaces by contact with first and second spring supports which form part of the housing and extend parallel to the first and second reference surfaces and the position line. A yoke moves the carriage but is isolated from the carriage by a five degree of freedom of movement connection. The yoke has arms with facing bearings which contact but float on planar bearing surfaces on the carriage which extend perpendicular to the position line. The housing has one fixed end cap and one cap with a floating connection to prevent the mounting of the housing from damaging the housing or the reference surfaces.

15 Claims, 4 Drawing Sheets

PRECISION CARRIAGE AND HOUSING FOR RELATIVE POSITION SENSING DEVICE

BACKGROUND OF THE INVENTION

1. Field of the Invention

This invention relates in general to electronic relative position sensing devices or devices which indicate the relative position of two elements, one moveable with respect to the other. More particularly, this invention relates to the carriage and housing mechanism of such devices.

2. Description of the Prior Art

In many areas of industry and manufacturing it is important to accurately position one element or device with respect to another. For example, in machining it is important that the tool bit be accurately positioned with respect to the work piece and the table holding the work piece. To allow this positioning to be performed a position sensor is often required. In addition to accurate relative positioning, it is also often necessary to move the work piece or element to and from or between very accurate relative positions.

For example, it might be desired to perform a first machining operation at one relative position and then automatically move the work piece to a second position and perform a second machining operation. Many times it is desired to have great accuracy in the machined work resulting from the first and second position. A position sensor with a reading mechanism therein can be used for automatic performance of such multiple stops. As the accuracy of the reading mechanisms increases it is required that the carriage mechanism for the reader mechanisms also be more precise to hold the reader for smooth, one-dimensional movement. This motion of the reader in the housing must be isolated from out-of-alignment movement in the pieces which move the reader.

Among the devices which desirably use such extremely accurate relative position sensing methods and devices are lathes, milling machines, microscopes, telescopes, industrial robots, cylinders, flight controls, drill presses, production automation equipment, etc.

Among the devices currently available for position sensing are electronic relative position sensors which have scales provided on them and means for electrically reading these scales. The scales can be attached to the lathe table or the like and the electrical readers of the scales can be connected to the lathe bed or the like, or vice versa. As the device moves, the reader electrically senses or determines the relative position between the scale and reader and, thereby, the relative position between the devices to which they are attached.

The carriage mechanism for these devices typically includes a carriage frame which rides within a housing. The frame carries the electrical reader next to the scale which is fixed within the housing. Usually bearings are mounted on the frame and these support the frame for rolling on the scale or on bearing surfaces of the housing. The frame is attached to one of the relative position pieces (such as a bed of a lathe) so that the position of this piece is followed by the reader while the scale and housing are fixed to the other relative position piece (such as the moveable table of the lathe) and follows this piece.

A serious problem with such carriage mechanisms and housings is that the connection between the carriage frame and the relative position element is not sufficiently stable to prevent some play or movement therebetween when the device changes direction. For example, a universal joint-type of connection must allow some movement in order not to be too stiff so as to move the frame off of the bearing surfaces and out of alignment with the scale. This movement in the universal joint causes hysteresis in the position measurement or sensing. Conversely, without a universal joint connection or a connection which allows some movement, out of alignment movement of the reader can destroy the accuracy of the measurement read or even damage the scale or the bearings.

Another problem is that even with a universal joint connection to the carriage frame, tilting moments of the carriage frame occur as the carriage is driven in one or both directions (depending on where the universal joint is located). Similarly, the bearings on the frame must be very carefully balanced and aligned to prevent rocking of the frame caused by differing pressures applied to the bearings. A similar problem is encountered because the pressures on the bearings must be maintained by springs between the frame and the relative position element. These springs can produce different bearing pressures as the carriage moves in different directions. This also causes rocking of the frame, which causes hysteresis in the position measurement or sensing.

Although precision bearings and joints can reduce the above problems, they can not eliminate them. Reduction of these problems by such precision elements and components is not suffient when the reader is capable of extreme accuracy or as described in U.S. patent application No. 217,015, filed July 8, 1988 and entitled Precision Electronic Absolute and Relative Position Sensing Device and Method of Using Same (the disclosure of which is hereby incorporated by reference).

Another problem of these types of carriage mechanisms and housings is that the mounting process for mounting the housing to a lathe or the like can stress or twist the housing causing the carriage frame to ride improperly and inaccurately therein, as well as distorting the scale.

SUMMARY OF THE INVENTION

It is accordingly an object of the present invention to provide an improved carriage mechanism for a position sensing device having a reader for reading the relative position of two elements attached to the device or the position of the carriage with respect to the housing. It is also an object of this invention to provide an improved housing for mounting the reader and supporting the carriage mechanism.

Another object of the present invention is to provide such a carriage and housing which provides very precise one-dimensional movement corresponding to the movement of the elements to which this device is attached in that one dimension. In other words, it is an object to provide a carriage mechanism which is restricted in five degrees of freedom while providing precise and accurate corresponding movement in the remaining one degree of freedom.

In accordance with these objects, the present invention provides a carriage and housing for a relative position device having a reader for reading the relative position of one element which is attached to the housing and the other element which is attached to the carriage all with respect to a position line of the device. The housing comprises a rider support having a first planar reference surface extending parallel to the position line and having a second planar reference surface extending parallel to the position line and approximately perpendicular to the first planar reference surface. The housing also includes first and second spring supports. The first spring support extends parallel to the first reference surface and is spaced therefrom. The second spring support extends parallel to the first reference surface and is spaced therefrom.

The carriage comprises a rider frame for moving along a said rider support and carrying a reader adjacent and constantly in close proximity to the position line. The rider frame has mounted thereon exactly five bearings for supporting the rider frame with respect to the rider support. The five bearings are disposed so that a first and second bearing are disposed parallel to the position line and support the frame with respect to the first planar reference surface. A third and fourth of said five bearings are disposed so that they are parallel to the position line and support the rider frame with respect to the second planar reference surface. The fifth bearing is disposed for supporting the rider frame with respect to the second planar reference surface and is not in alignment with the third and fourth of said five bearings.

Preferably, the five bearings are arranged at the edges of a right rectangular parallelepiped. The first, second, third and fourth bearings are disposed at the corners of the parallelepiped edges with the first bearing being diagonally opposite the fourth bearing and the second bearing being diagonally opposite the third bearing. The fifth bearing is disposed on the edge of the rectangular parallelepiped extending between the edges of the first, second, third and fourth bearings and is disposed approximately at the center of this edge. In this manner the third, fourth and fifth bearings form a triangular support restricting three degrees of freedom of movement of the rider frame while he first and second bearings form a linear support in a plane perpendicular to the plane of the third, fourth and fifth bearings to restrict two additional degrees of freedom. The result is that five degrees of freedom of the frame movement are restricted leaving only the one degree of freedom of movement parallel to the position line of the device. The spacing of each of the bearings from each other is relatively wide to provide a broad base of support.

A first spring connected to the carriage is disposed opposite the first and second bearings and contacts the first spring support to urge the frame toward the first reference surface. A second spring connected to the carriage is disposed opposite the third, fourth and fifth bearings and contacts the second spring support to urge the frame toward the second reference surface. Because the springs are mounted to the carriage and contact spring supports which are part of the housing, the carriage and housing are isolated in a frame of reference which is separate from the frame of reference of the device which moves the carriage.

The rider frame is connected to the position element which it must track (the element which moves the carriage) by a yoke which contacts and moves the carriage with five degrees of freedom (restricted only in the dimension of the position line). The yoke has a pair of arms forming a "u" shape. The arms have contacts or bearings at their ends which face each other. The rider frame is provided with planar bearing surfaces extending transverse (perpendicular) to the position line and adapted for receiving the bearings of the arms so that the bearings of the arms are free to move on the bearing surfaces except along the degree of freedom parallel to the position line. Preferably, the bearings are comprised of cups which have a planar surface for riding on the planar bearing surface with cylindrical recesses for receiving cylindrical bearing surfaces of the arms.

The housing is attached to the relative position element by means of a fixed end cap which holds the housing and rider support in a fixed position relative to the relative position element. The housing also has a floating end cap which holds the housing only in a fixed relation to the relative position element along a line parallel to the relative position line.

For a further understanding of the invention and further objects, features and advantages thereof, reference may now be had to the following description taken in conjunction with the accompanying drawings.

DESCRIPTION OF PREFERRED EMBODIMENTS

Figure 1:
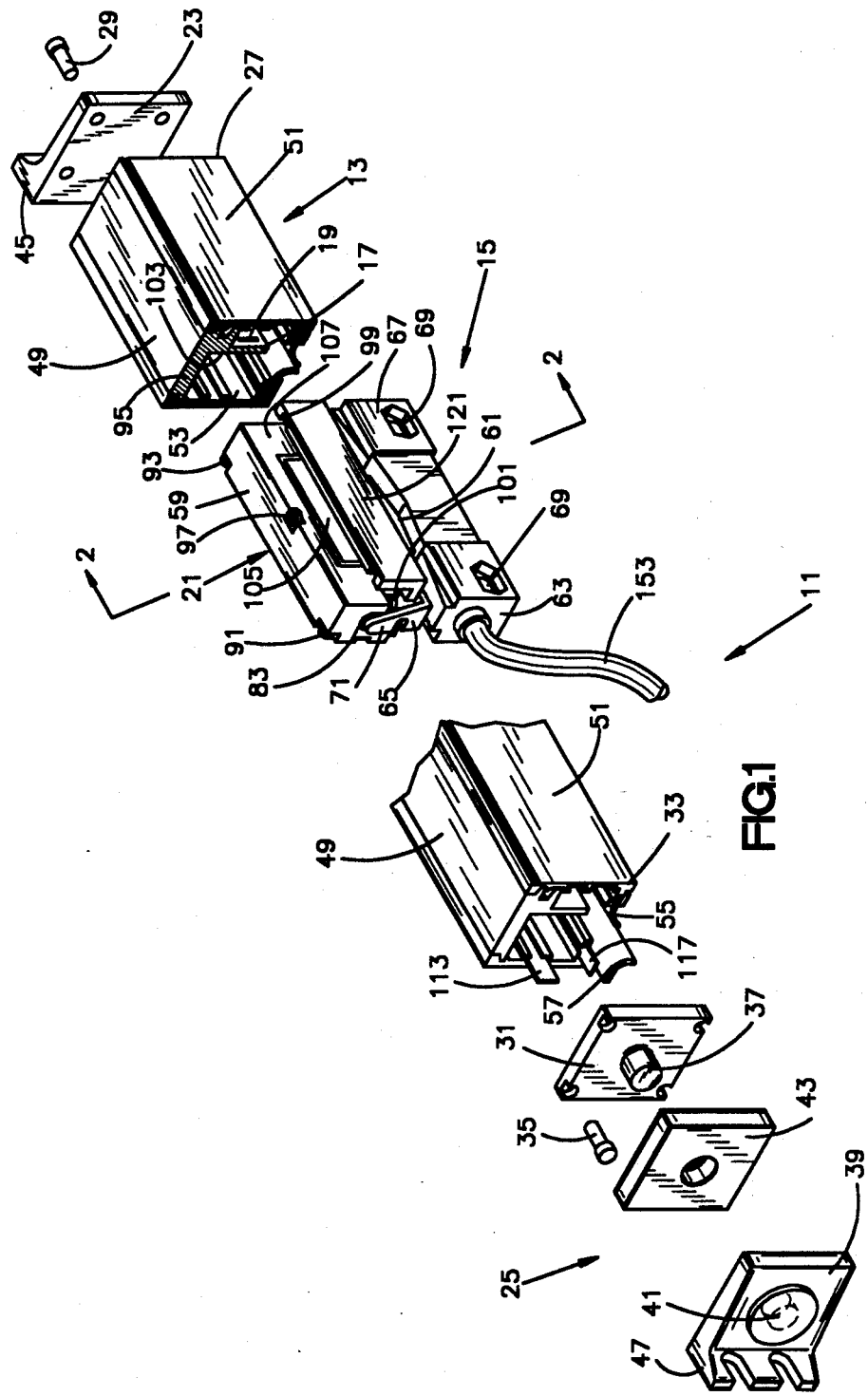
FIG. 1 is an exploded, cutaway perspective view of a device constructed in accordance with the present invention.
Figure 2:
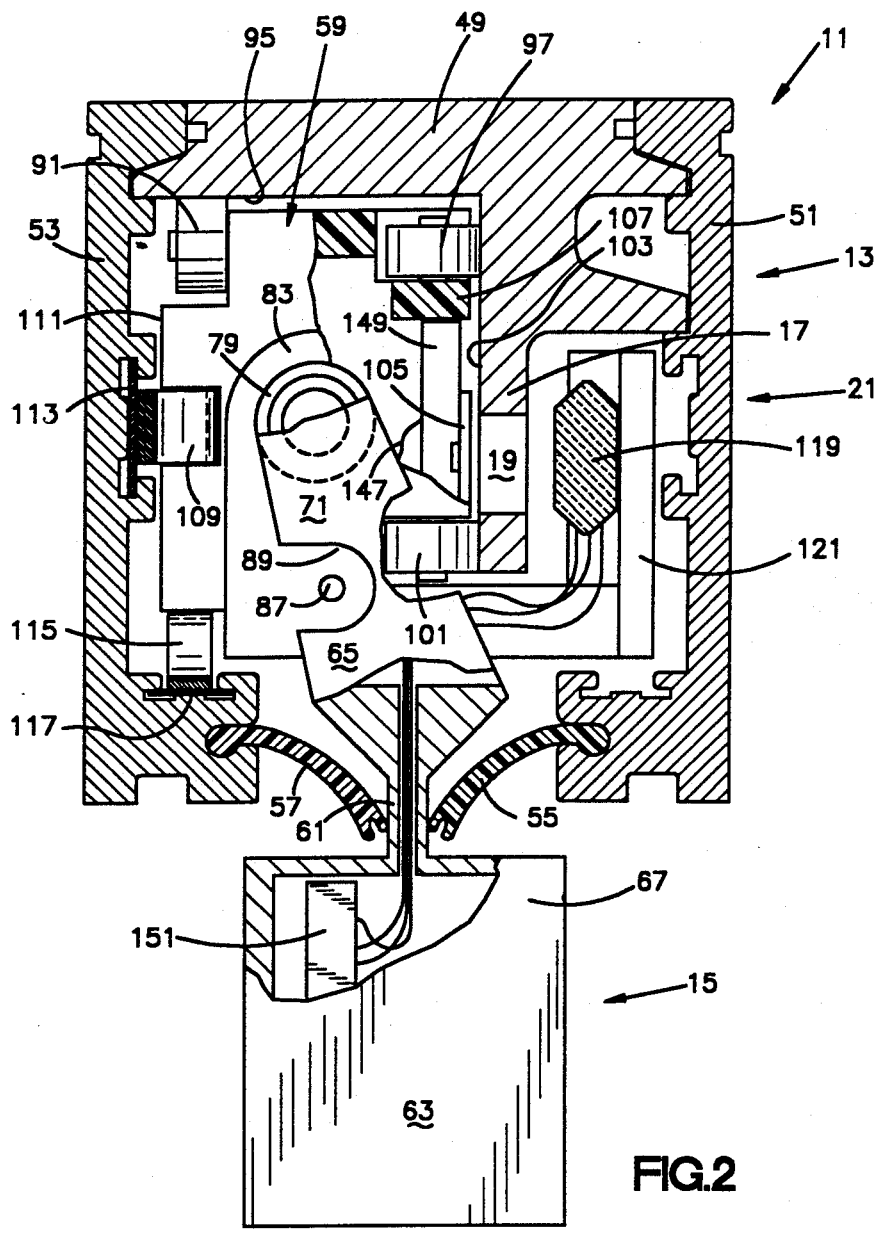
FIG. 2 is a sectional view of the device shown in FIG. 1 taken along the lines shown in FIG. 1.
Figure 3:
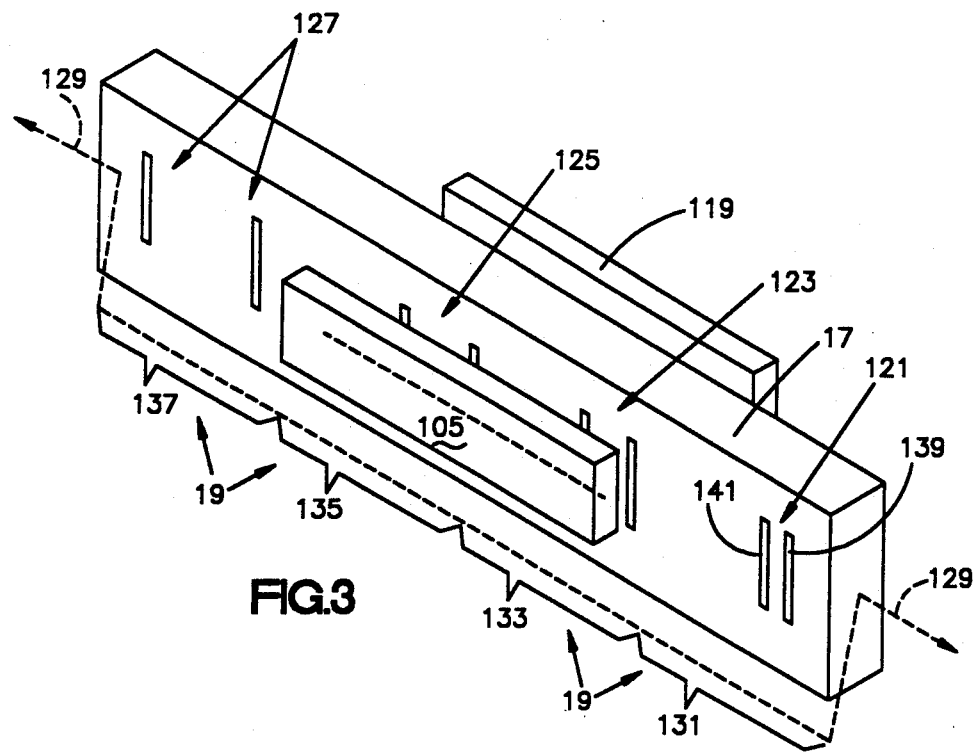
FIG. 3 is a perspective view of a portion of the device shown in FIG. 1.
Figure 4:
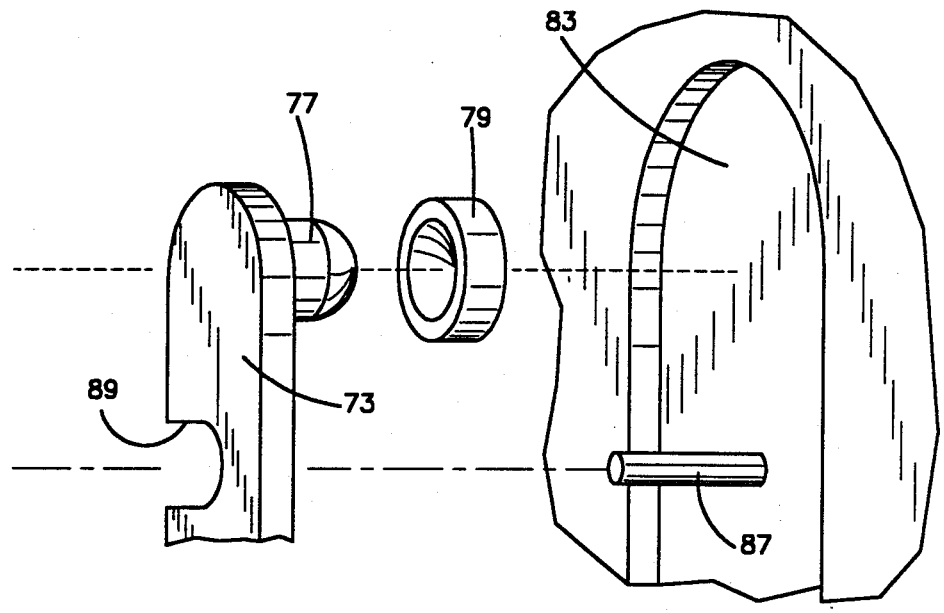
FIG. 4 is an enlarged view of a portion of the device shown in FIG. 1.
Figure 5:
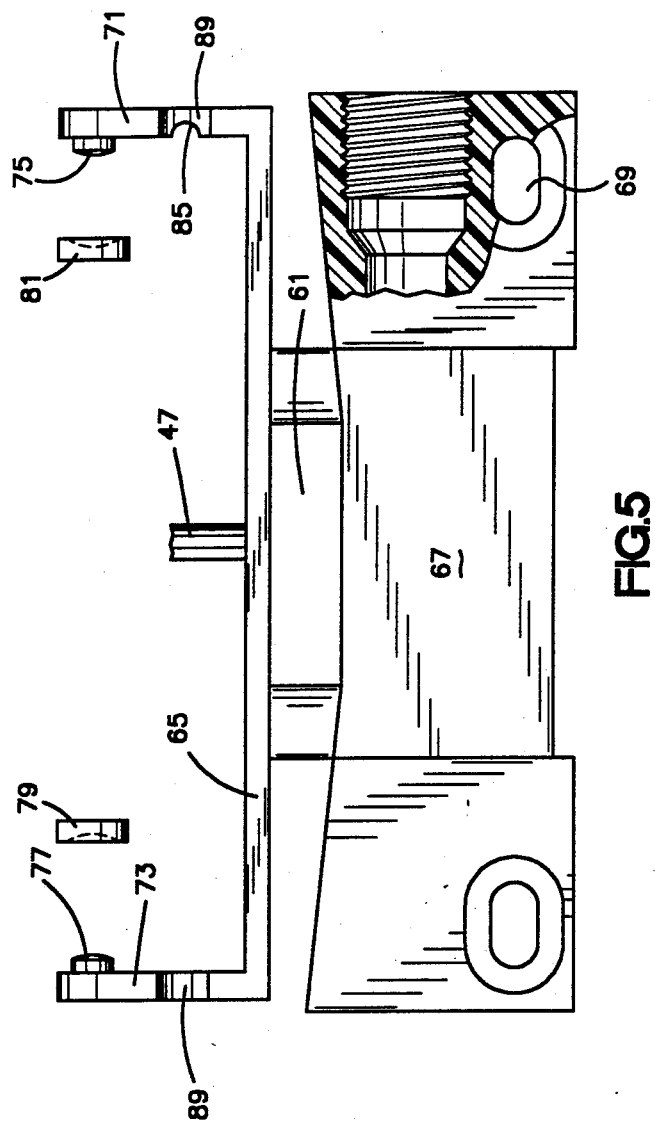
FIG. 5 is a side view of a portion of the device shown in FIG. 1.

Referring now to FIGS. 1, 2 and 3, the position device of the present invention is shown at 11. The device 11 includes a scale housing 13 and a traveler assembly 15. The scale housing 13 has a scale bar 17 with slits 19 therein which can be read by an electrical-optical reader 21 of the traveler assembly 15.

By fixing the scale housing 13 to one element or device and the traveler assembly 15 to a second element or device, the relative position between the two elements can be electrically read by the device 11 of the present invention. For example, the scale housing 13 can be attached to the movable table of a lathe and the traveler assembly 15 can be attached to bed of the lathe so that the relative position between the table and the bed can be electrically read. This would allow the bed to be accurately positioned with respect to a work piece mounted on the chuck fixed for rotation on the bed for accurate, automatic positioning and machining operations on the work piece.

To attach the scale housing 13 to an external element or device, end caps 23 and 25 are provided. End cap 23 is a single piece which is attached directly to the fixed or reference end 27 of the scale housing 13 by assembly screws 29. End cap 25 is comprised of three pieces (31, 39, 43) and functions as a floating end mount. A cap piece 31 is connected to the floating or non-reference end 33 of housing 13 by assembly screws 35. A cylindrical protruding nose 37 extends from the cap piece 31 to provide a floating connection to a mount piece 39. A recess 41 closely but freely receives the cylindrical nose 37. A compressible spacer 43 is resiliently captured between the cap piece 31 and the mount piece 39 with the nose 37 extending therethrough. The spacer 43 is a resilient, compressible, vibration insulative material. A flange 45 is provided on end cap 23 with bolt holes therethrough to allow the end cap 23 to be bolted to an element such as a work table of a lathe. A flange 47 of mount piece 39 is provided with bolt holes so that it can be bolted to this same element. In this way the scale housing 13 is joined to the element or device in a way which fixes the reference end against movement while allowing the non-reference end a relative freedom of movement. This relative freedom of movement is required so that the mounting process does not twist or distort the scale housing 13. Further, the method of mounting allows thermal expansion of the housing to occur without distortion of the housing. The compressible spacer 43 protects the housing against vibration and foreign object damage, shipping damage and mismounting.

The scale housing 13 is comprised of a scale extrusion 49, a right side housing extrusion 51, a left side housing extrusion 53 and seal lips 55 and 57. These pieces enclose and protect the rider portion 59 of the traveler assembly 15 against contamination and physical abuse. The rider portion 59 carries the electrical-optical reader 21 for the scale bar 17 which extends as an interior flange from the scale extrusion 49. Mating grooves and flanges are provided between the right and left side housing extrusions and scale extrusion 49 so that these pieces form a solid housing when connected to the cap piece 31 and the end cap 23. The extrusion pieces 49, 51 and 53 can all be formed from aluminum or the like.

The seal lips 57 and 53 are formed of a flexible material which is preferably chemically resistant such as teflon brand polymer fluorosilicone. The lips 55 and 57 have beads which are retained in a widened space in grooves in the left and right side housing pieces 51 and 53, respectively. The lips 55 and 57 extend toward each other to form a vee shape which is able to be opened by the neck 61 of the traveler head 63 of the traveler assembly 15.

The traveler head 63 is a single piece of molded material such as Ryton brand thermoplastic. This piece includes a yoke 65 and a head piece 67 connected by the neck 61. Bolt holes 69 are provided in the head piece 67 so that the traveler head 63 can be connected to an external element by bolts extending through these bolt holes 69. In this way the traveler head can be connected to a device such as the bed of a lathe so that the relative position between the bed (attached to the traveler head 63) and the moveable table (attached to the scale housing 13) can be determined.

As seen best in FIGS. 1, 2, 4 and 5 the yoke 65 of the traveler head 63 has a pair of arms 71, 73 which have semi-spherical bearing surfaces 75 and 77, thereon. These bearing surfaces each receive an interface cup 79 and 81 which functions as a floating interface or bearing between the end of the rider 59 which is moved by the traveler head 63 because of the yoke 65. The interface cups have a planar surface which is received on mating planar bearing surfaces 83 provided on opposite ends of the rider 59 (shown enlarged in FIG. 4). The planar bearing surfaces 83 are perpendicular to the position line 129 and the bearings or cups 79 and 81 are parallel to the position line 129. The yoke arms 71 and 73 are slightly resiliently spread by the close fit of the rider 59 inside the interface cups 79 and 81. However, the amount by which the arms are spread and the pressure on the interface cups is not so much as to prevent the planar surfaces of the interface cups from relatively freely gliding on the planar surface of the recess. This pressure can be determined by a groove 85 which weakens and improves the flexibility of arm 71. In this way, the yoke 65 has a reference end at arm 73 and a non-reference end at arm 71, similar to the reference and non-reference end of the housing 13. The characteristics of the material and the size of the groove 85 can determine how stiffly the yoke 65 holds the rider 59.

The object of this connection between the yoke arm 71 and 73 and the rider 59 is to prevent non-linear movements of the traveler head 63 from causing similar non-linear movements of the rider 59. In other words, the rider 59 is desired to be retained in its position with respect to the scale bar 17 as it moves linearly with respect thereto. By providing a five degree of freedom connection between the rider 59 and traveler head 63, this object can be achieved.

To hold the yoke arms 71 and 73 from becoming disconnected entirely from the rider 59 prior to mounting the scale housing 13 and the traveler assembly 15 to the relative position elements which they track, pins 87 are received through retaining pin slots 89 in the yoke arm 71 and 73.

The purpose for the five degree of freedom movement of the yoke 65 and the traveler head 63 with respect to the rider 59 is so that the rider 59 is not urged out of its linear motion with respect to the scale bar 17. In other words it is critical that the linear motion of the rider 59 in its frame of reference (which includes the scale bar 17) not be disturbed by movements in the frame of reference of the traveler head 63 which are other than linear movements parallel to the linear motion of the rider 59 (parallel to an imaginary position line 129 extending through the center of bar 17).

To further improve this restriction of the rider 59 to a linear motion, a unique bearing and spring system is provided. Contact bearings 91 and 93 are provided in the corners of the rider 59 to bear against a first planar reference surface 95 of the scale extrusion 49 adjacent the left housing extrusion 53. Contact bearings 97, 99 and 101 are disposed on the rider 59 so that they ride on a second planar reference surface 103 of the scale extrusion 49. The second reference surface 103 is formed in part by a surface of the scale bar 17. The second planar surface 103 is disposed at a right angle to the first planar surface 95. Bearings 97, 99 and 101 form a triangle, the center of which is approximately the center of a charge-coupled device 105.

The charge-coupled device 105 is positioned so that its face is close to and approximately parallel to the face 107 of rider 59 which rides adjacent the second planer reference surface 103. Thus, as the bearings 97, 99 and 101 ride on the second planar reference surface 103, the charge-coupled device 105 is held a fixed close distance spaced from the scale bar 17 and the slits 19 therein.

The body of rider 59 has a right rectangular parallelepiped shape with rectangular face 107 being a portion thereof. To provide a wide, steady support so as to retain the rider 59 in its linear motion in its frame of reference, bearings 91, 93, 99 and 101 are disposed at corners of the body. Bearings 91 and 93 are at upper corners of a surface 111 opposite face 107 and bearings 99 and 101 are at the lower corners of face 107. Bearing 97 is at the center of the upper edge of face 107.

Opposite the contact bearings 97, 99 and 101 is a leaf spring 109. The leaf spring 109 is attached to surface 111 of rider 59 so that it contacts near the center of this surface. It bears against a leaf spring wear shim 113 which is held in a mating groove on the left housing extrusion 53. In this way the leaf spring 109 urges the rider 59 so that approximately equal pressure is applied to bearings 97, 99 and 101. Further, the center contact helps prevent hysteresis as the rider 59 changes direction.

A leaf spring 115 is provided directly opposite bearings 91 and 93 on rider 59. It contacts a leaf spring wear shim 117 which extends in a mating groove in a lower flange of the left housing extrusion 53. The leaf spring 115 contacts the wear shim at approximately the center of the rider 59 opposite the bearings 91 and 93 so that it urges the rider 59 to press on the bearings 91 and 93 against the first reference surface 95 with approximately equal force.

By use of the five bearings 91, 93, 97, 99 and 101, at the diagonally opposite corners of the rider 59 (bearing 91 being diagonally opposite bearing 99 and bearing 93 being diagonally opposite bearing 101) and with bearing 97 being centered on the rectangular edge between the diagonally opposite bearings, the rider 59 is limited to only one degree of freedom in its movement as long as the springs 115 and 109 cause the bearings to be pressed against their reference surfaces with equal strength. This is achieved with a minimum number of bearings and springs. The minimum number is critically important to prevent rocking of the rider and hysteresis which would occur if more bearings were included but not precisely balanced.

The combination of the design of housing 13, rider 59 support in housing 13, and connection of the traveler 63 to the rider 59 produces a relative motion device which is especially precise and avoids disturbances to linear motion. It isolates the frame of reference of the rider and scale from the frame of reference of the traveler head except for the linear degree of freedom parallel to the bar 17 and its imaginary position line extending longitudinally therethrough. This importantly allows the reader 21 to track precisely for reading the slits 19 in scale bar 17.

The housing mounting prevents the scale from being distorted during the mounting process or due to other forces. Particularly, the floating end 33 of the housing 13 protects the traveling surfaces and the scale from distortions. The bearings which support the rider 59 prevent the reader 21 from moving out of a linear path along the bar 19. The connection of the traveler 63 with the rider 59 prevents the out of line motions of the traveler 63 from being transmitted to the rider 59. Thus, precise, repeatable linear motion of the reader 21 with respect to the bar 17 and slits 19 is provided.

The importance of the steady, smooth tracking of the rider 59 along the reference surfaces 95 and 103 in housing 13 becomes apparent with the understanding of the accuracy which the reader 21 provides. The reader 21 includes the charge-coupled device 105 and a light source 119. The light source 119 is mounted on an arm 121 of the rider 59 which extends around bar 17. The light source 119 is attached so that it faces the charge-coupled device 105 so as to shine light through the slits 19.

The charge-coupled device 105 is preferably a device like Texas Instruments part No. TC104. This device is approximately 2 inches long and has 3,456 pixels arranged along its length for electrically reading light received from the light source 119. Each pixel has both an on/off and a strength of light signal. The charge-coupled device has a dynamic range of approximately 1,000 to 1 and a read speed of faster than 0.5 milliseconds. The construction, operation, reading and powering of such charge-coupled devices is well known to those in the electrical art.

The light source 119 extends over a 2 inch length parallel to and directly in line with the charge-coupled device 105. Preferably, this light source 119 approximates a lambertian light source over this entire length. In other words, the light source 119 provides uniform, non-directional light along all of the length of the light source so that a slit 19 at any position between the light source 119 and the charge-coupled device 105 will be read uniformly. Electro luminescent panels are commercially available from Luminescence Systems, Inc. and Quantex, Inc. The operation, construction and powering of such panels are well known to those in the art of light sources. Further, an improved lambertian light source of a type particularly suited for use with the device of the present invention is described in my co-pending application filed of even date herewith and entitled Linear Diffuse Light Source (incorporated herein by reference).

The slits 19 in scale 17 are arranged in pairs along the bar 17. Pairs 121, 123, 125 and 127 are shown in bar 17 of FIG. 3. Each slit 19 extends transversely to an imaginary position line through an imaginary position line which extends through the center of bar 17. Each slit 19 also extends transversely through the bar 17. The slits 19 can be formed by laser cutting or by an electrodischarge machine. They do not require precise positioning. The bar 17, the arm 121 and the housing 13 allow only light from the light source 119 to be received by the charge-coupled device 105 through the slits 19.

Conceptually, the scale or distance along position line 129 can be divided into segments such as segments 131, 133, 135 and 137. These segments are continuous and do not overlap along the position line 129. Each segment has a single pair of slits disposed therein. Thus, pair 121 is located within segment 131, pair 123 is located within segment 133, and so on.

Each pair of slits defines and determines both the segment and a precise position within the segment. The distance between the slits of each pair is unique for each segment. A distance measurement between the slits 19 of pair 121 thus define that this pair of slits 121 resides in segment 131. The distance between the slits 19 of pair 123, because this distance measurement is different, defines that the pair of slits 123 reside in segment 133.

A precise position along the position line 129 can be determined by the combination of the locations of the slits 19 in a pair such as pair 121. For example, if a first slit 139 of pair 121 were located at 5.2 inches along the position line 129 and the second slit 141 of pair 121 were located 5.4 inches along the position line 129, the precise position along the segment defined by the combination would be an average 5.3 inches along the position line. Thus, the combination of the slit positions 139 and 141 could define a precise position of 5.3 inches along the position line. As described in more detail below, the present invention does not require that the slits be positioned precisely at 5.2 and 5.4 inches, for example, while defining a very precise position within the segment.

Although the present invention is easily adapted to many different sizes, it would typically be from a few inches to several feet long. The device depicted is approximately 4 feet long and approximately 2 inches wide. The slits 19 are typically 0.04 inches wide. If desired, the width of the slits 19 can be used to provide additional information or as a substitute for slit pairs. However, this would reduce the accuracy of the device by reducing the amount of information used to determine the positions.

Thus, the device of the present invention is well adapted to achieve the objects and advantages mentioned as well as those inherent therein. It will be appreciated that the instant specification and claims are set forth by way of illustration and not of limitation, and that various changes and modifications may be made without departing from the spirit and scope of the present invention.

What is claimed is:

1. An improved carriage and housing for a position sensing device of the type having a carriage carrying a reader for reading the position of the carriage with respect to the housing along a position line of the device, the improvement comprising:

the housing including a rider support having first and second planar reference surfaces and first and second spring supports; said first planar reference surface extending parallel to said position line with said first spring support extending parallel thereto and spaced therefrom, and said second planar reference surface extending parallel to the position line and approximately perpendicular to the first planar reference surface with said second spring support extending parallel thereto and spaced therefrom;

the carriage including a rider frame for riding adjacent said rider support and carrying said reader;

exactly five bearings mounted on said rider frame for supporting the rider frame with respect to the first and second planar reference surfaces of said rider support, said five bearings being disposed so that a first and second of said bearings are disposed parallel to said position line and support said rider frame with respect to said first planar reference surface, said third and fourth bearings are disposed parallel to said position line and support said rider frame with respect to said second planar reference surface, and said fifth bearing is disposed to support said rider frame with respect to said second planar reference surface and disposed other than in alignment with said third and fourth bearings; and first and second springs mounted on said rider frame, said first spring being disposed on said rider frame opposite said first and second bearings and bearing against said first spring support to urge said frame toward said first planar reference surface and said second spring being disposed on said rider frame opposite said third, fourth and fifth bearings and bearing against said second spring support to urge said frame toward said second planar reference surface.

2. The carriage and housing of claim wherein said carriage further comprises first and second planar bearing surfaces extending perpendicular to said position line and spaced from each other; and a yoke for moving said carriage in said housing, said yoke having first and second arms with first and second arm bearings disposed at the ends of said first and second arms, respectively; said arm bearings contacting said first and second planar bearing surfaces such that said yoke has five degrees of freedom of movement with respect to said carriage.

3. The carriage and housing of claim 2 wherein said arms each have semi-spherical bearing surfaces and said arm bearings comprise interface cups received on said semi-spherical bearing surfaces of said arms.

4. The carriage and housing of claim 1 wherein said housing further comprises a first end cap for mounting said housing to an external device said end cap being fixed with respect to said first and second planar reference surfaces, and a second end cap for mounting said housing to an external device, said end cap being connected with respect to said first and second planar reference surfaces by a floating connection.

5. The carriage and housing of claim 4 wherein said second end cap includes a first piece fixed to said housing and having a cylindrical nose extending therefrom, and a second piece having a cylindrical recess for receiving said cylindrical nose to form said floating connection.

6. The carriage and housing of claim 5 which further comprises a resilient, insulation piece extending between said first and second pieces of said second end cap for insulating said housing from external shocks and vibration.

7. An improved carriage and housing for a position sensing device of the type having a carriage carrying a reader for reading the position of the carriage with respect to the housing along a position line of device, the improvement comprising:

the carriage having first and second planar bearing surfaces extending perpendicular to the position line and spaced from each other; and a yoke for moving said carriage with respect to said housing, said yoke having first and second arms with first and second arm bearings displaced at the ends of said arms, respectively; said arm bearings being positioned parallel to said position line and contacting said first and second planar bearing surfaces such that said yoke has five degrees of freedom of movement with respect to said carriage.

8. The carriage and housing of claim 7 wherein said arms each have a semi-spherical bearing surfaces and said arm bearings comprise interface cups received on said semi-spherical bearing surfaces of said arms.

9. The improved carriage and housing of claim 8 wherein;

said housing includes a rider support having first and second planar reference surfaces and first and second spring supports; said first planar reference surface extending parallel to said position line with said first spring support extending parallel thereto and spaced therefrom, and said second planar reference surface extending parallel to the position line and approximately perpendicular to the first planar reference surface with said second spring support extending parallel thereto and spaced therefrom;

said carriage includes a rider frame for riding adjacent said rider support and carrying said reader;

exactly five bearings mounted on said rider frame for supporting the rider frame with respect to the first and second planar reference surfaces of said rider support, said five bearings being disposed so that a first and second of said bearings are disposed parallel to said position line and support said rider frame with respect to said first planar reference surface, said third and fourth bearings are disposed parallel to said position line and support said rider frame with respect to said second planar reference surface, and said fifth bearing is disposed to support said rider frame with respect to said second planar reference surface and disposed other than in alignment with said third and fourth bearings; and first and second springs mounted on said rider frame, said first spring being disposed on said rider frame opposite said first and second bearings and bearing against said first spring support to urge said frame toward said first planar reference surface and said second spring being disposed on said rider frame opposite said third, fourth and fifth bearings and bearing against said second spring support to urge said frame toward said second planar reference surface.

10. The carriage and housing of claim 9 wherein said housing further comprises a first mounting end cap for mounting said housing to an external device said end cap being fixed with respect to said first and second planar reference surface, and a second end cap being connected with respect to said first and second planar reference surfaces by a floating connection.

11. An improved carriage and housing for a position sensing device of the type having a carriage carrying a reader for reading the position of the carriage with respect to the housing along a position line of the device, the improvement comprising;

the housing including a rider support having first and second planar reference surfaces upon which said carriage rides; and said housing further comprising a first end cap for mounting said housing to an external device said end cap being fixed with respect to said first and second planar reference surfaces, and a second end cap for mounting said housing to an external device, said end cap being connected with respect to said first and second planar reference surfaces by a floating connection.

12. The carriage and housing of claim 11 wherein said second end cap includes a first piece fixed to said housing and having a cylindrical nose extending therefrom, and a second piece having a cylindrical recess for receiving said cylindrical nose to form said floating connection.

13. The carriage and housing of claim 12 which further comprises a resilient, insulating piece extending between said first and second pieces of said second end cap for insulating said housing from external shocks and vibration.

14. The carriage and housing of claim 11 wherein said housing includes first and second spring supports; said first planar reference surface extending parallel to said position line with said first spring support extending parallel thereto and spaced therefrom, and said second planar reference surface extending parallel to the position line and approximately perpendicular to the first planar reference surface with said second spring support extending parallel thereto and spaced therefrom;

the carriage including a rider frame for riding adjacent said rider support and carrying said reader;

exactly five bearings mounted on said reader frame for supporting the rider frame with respect to the first and second planar reference surfaces of said rider support, said five bearings being disposed so that a first and second of said bearings are disposed parallel to said position line and support said rider frame with respect to said first planar reference surface, said third and fourth bearings are disposed parallel to said position line and support said rider frame with respect to said second planar reference surface, and said fifth bearing is disposed to support said rider frame with respect to said second planar reference and disposed other than in alignment with said and fourth bearings; and first and second springs mounted on said rider frame, said first spring being disposed on said rider frame opposite said first and second bearings and bearing against said first spring support to urge said frame toward said first planar reference surface and said second spring being disposed on said rider frame opposite said third, fourth and fifth bearings and bearing against said second spring support to urge said frame toward said second planar reference surface.

15. The carriage and housing of claim 14 wherein said carriage further comprises first and second planar bearing surfaces extending perpendicular to said position line and spaced from each other; and a yoke for moving said carriage in said housing, said yoke having first and second arms with first and second arm bearings disposed at the ends of said first and second arms, respectively; said arm bearings contacting said first and second planar bearing surfaces such that said yoke has five degrees of freedom of movement with respect to said carriage.

* * * * *